United States Patent
Kondou et al.

(10) Patent No.: US 10,604,208 B2
(45) Date of Patent: Mar. 31, 2020

(54) BICYCLE SUSPENSION TUBE AND BICYCLE SUSPENSION FORK

(71) Applicant: SHIMANO INC., Sakai (JP)

(72) Inventors: Akira Kondou, Sakai (JP); Takuma Sakai, Sakai (JP); Hideki Ikemoto, Sakai (JP)

(73) Assignee: SHIMANO INC., Sakai (JP)

( * ) Notice: Subject to any disclaimer, the term of this patent is extended or adjusted under 35 U.S.C. 154(b) by 54 days.

(21) Appl. No.: 15/460,182

(22) Filed: Mar. 15, 2017

(65) Prior Publication Data

US 2018/0265153 A1 Sep. 20, 2018

(51) Int. Cl.
| | |
|---|---|
| *B62K 25/08* | (2006.01) |
| *B62K 19/38* | (2006.01) |
| *B62L 1/00* | (2006.01) |
| *B62K 21/02* | (2006.01) |
| *B62K 3/02* | (2006.01) |
| *B62K 5/06* | (2006.01) |

(52) U.S. Cl.
CPC ............ *B62K 25/08* (2013.01); *B62K 19/38* (2013.01); *B62K 21/02* (2013.01); *B62L 1/005* (2013.01); *B62K 3/02* (2013.01); *B62K 5/06* (2013.01)

(58) Field of Classification Search
CPC .................................. B62K 3/02; B62L 5/006
See application file for complete search history.

(56) References Cited

U.S. PATENT DOCUMENTS

| | | | | | |
|---|---|---|---|---|---|
| 3,989,124 | A | * | 11/1976 | Fujii ......................... | B62L 1/00 188/26 |
| 6,230,849 | B1 | * | 5/2001 | Lumpkin ................ | B62L 1/005 188/24.12 |
| 6,340,074 | B1 | * | 1/2002 | Lumpkin ................ | F16D 65/18 188/26 |
| RE42,635 | E | * | 8/2011 | Kirimoto .............. | B60T 11/046 188/26 |
| 8,496,094 | B2 | * | 7/2013 | Powell .................... | B62K 25/08 188/285 |
| 8,936,136 | B2 | * | 1/2015 | Thomas .................. | F16D 55/22 188/26 |
| 2014/0103130 | A1 | * | 4/2014 | Brown .................... | F16M 13/02 237/66 |
| 2015/0001012 | A1 | * | 1/2015 | Noborio .................. | B62L 1/005 188/72.4 |
| 2015/0308524 | A1 | * | 10/2015 | Nakakura ............... | B62L 1/005 188/71.1 |
| 2016/0272269 | A1 | * | 9/2016 | Tsai ........................ | B62K 21/02 |

FOREIGN PATENT DOCUMENTS

| | | |
|---|---|---|
| CN | 104249796 | 12/2014 |
| CN | 105134831 | 12/2015 |

* cited by examiner

*Primary Examiner* — Joseph M Rocca
*Assistant Examiner* — Marlon A Arce
(74) *Attorney, Agent, or Firm* — Mori & Ward, LLP (57) ABSTRACT

A bicycle suspension tube comprises a tubular body, a wheel attachment part, and a caliper attachment part. The wheel attachment part is provided on the tubular body. The wheel attachment part includes an attachment hole having a rotational center axis. The caliper attachment part is provided on the tubular body. The caliper attachment part includes a first through hole having a first longitudinal axis non-parallel to the rotational center axis.

20 Claims, 6 Drawing Sheets

BICYCLE SUSPENSION TUBE AND BICYCLE SUSPENSION FORK

BACKGROUND OF THE INVENTION

Field of the Invention

The present invention relates to a bicycle suspension tube and a bicycle suspension fork.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a suspension.

SUMMARY OF THE INVENTION

In accordance with a first aspect of the present invention, a bicycle suspension tube comprises a tubular body, a wheel attachment part, and a caliper attachment part. The wheel attachment part is provided on the tubular body. The wheel attachment part includes an attachment hole having a rotational center axis. The caliper attachment part is provided on the tubular body. The caliper attachment part includes a first through hole having a first longitudinal axis non-parallel to the rotational center axis.

With the bicycle suspension tube according to the first aspect, the caliper attachment part improves flexibility of arrangement of a bicycle disc brake caliper.

In accordance with a second aspect of the present invention, a bicycle suspension tube comprises a tubular body, a wheel attachment part, and a caliper attachment part. The wheel attachment part is provided on the tubular body. The wheel attachment part includes an attachment hole having a rotational center axis. The caliper attachment part is provided on the tubular body. The caliper attachment part includes a first through hole having a first longitudinal axis extending without defining an imaginary plane between the first longitudinal axis and the rotational center axis.

With the bicycle suspension tube according to the second aspect, the caliper attachment part improves flexibility of arrangement of a bicycle disc brake caliper.

In accordance with a third aspect of the present invention, the bicycle suspension tube according to the second aspect is configured so that the caliper attachment part includes a second through hole having a second longitudinal axis extending without defining an imaginary plane between the second longitudinal axis and the rotational center axis.

With the bicycle suspension tube according to the third aspect, the second through hole improves flexibility of arrangement of the bicycle disc brake caliper with improving coupling strength between the bicycle disc brake caliper and the bicycle suspension tube.

In accordance with a fourth aspect of the present invention, the bicycle suspension tube according to any one of the first to third aspects is configured so that the tubular body has a tube center axis. The first longitudinal axis and the second longitudinal axis are inclined relative to the tube center axis as viewed in an axial direction of the rotational center axis.

With the bicycle suspension tube according to the fourth aspect, the arrangement of the first and second longitudinal axes effectively improves flexibility of arrangement of the bicycle disc brake caliper.

In accordance with a fifth aspect of the present invention, the bicycle suspension tube according to the fourth aspect is configured so that a first inclination angle is defined between the first longitudinal axis and the tube center axis as viewed in the axial direction. The first inclination angle is equal to or larger than 30 degrees and is equal to or smaller than 70 degrees.

With the bicycle suspension tube according to the fifth aspect, the first inclination angle effectively improves flexibility of arrangement of the bicycle disc brake caliper.

In accordance with a sixth aspect of the present invention, the bicycle suspension tube according to any one of the first to fifth aspects is configured so that the caliper attachment part includes a second through hole having a second longitudinal axis non-parallel to the rotational center axis.

With the bicycle suspension tube according to the sixth aspect, the second through hole improves flexibility of arrangement of the bicycle disc brake caliper with improving coupling strength between the bicycle disc brake caliper and the bicycle suspension tube.

In accordance with a seventh aspect of the present invention, the bicycle suspension tube according to the sixth aspect is configured so that a second inclination angle is defined between the second longitudinal axis and the tube center axis as viewed in the axial direction. The second inclination angle is equal to or larger than 30 degrees and is equal to or smaller than 70 degrees.

With the bicycle suspension tube according to the seventh aspect, the second inclination angle effectively improves flexibility of arrangement of the bicycle disc brake caliper.

In accordance with an eighth aspect of the present invention, the bicycle suspension tube according to any one of the first to seventh aspects is configured so that the tubular body has a tube center axis. The caliper attachment part includes a caliper attachment surface inclined relative to the tube center axis as viewed in an axial direction of the rotational center axis.

With the bicycle suspension tube according to the eighth aspect, the caliper attachment surface improves flexibility of arrangement of the bicycle disc brake caliper with stabilizing an orientation of the bicycle disc brake caliper relative to the bicycle suspension tube.

In accordance with a ninth aspect of the present invention, the bicycle suspension tube according to the eighth aspect is configured so that an inclination angle is defined between the caliper attachment surface and the tube center axis as viewed in the axial direction. The inclination angle is equal to or larger than 10 degrees and is equal to or smaller than 60 degrees.

With the bicycle suspension tube according to the ninth aspect, the inclination angle of the caliper attachment surface effectively improves flexibility of arrangement of the bicycle disc brake caliper.

In accordance with a tenth aspect of the present invention, the bicycle suspension tube according to the eighth or ninth aspect is configured so that the caliper attachment surface includes a first attachment surface and a second attachment surface.

With the bicycle suspension tube according to the tenth aspect, the first and second attachment surfaces effectively improve flexibility of arrangement of the bicycle disc brake caliper with stabilizing an orientation of the bicycle disc brake caliper relative to the bicycle suspension tube.

In accordance with an eleventh aspect of the present invention, the bicycle suspension tube according to the tenth aspect is configured so that the caliper attachment part includes a second through hole having a second longitudinal axis non-parallel to the rotational center axis. The first through hole is provided on the first attachment surface. The second through hole is provided on the second attachment surface.

With the bicycle suspension tube according to the eleventh aspect, the caliper attachment part effectively improves flexibility of arrangement of the bicycle disc brake caliper with stabilizing an orientation of the bicycle disc brake caliper relative to the bicycle suspension tube.

In accordance with a twelfth aspect of the present invention, the bicycle suspension tube according to any one of the first to tenth aspects is configured so that the caliper attachment part includes a second through hole having a second longitudinal axis non-parallel to the rotational center axis. The caliper attachment part includes a first attachment portion and a second attachment portion spaced apart from the first attachment portion. The first attachment portion includes the first through hole. The second attachment portion includes the second through hole.

With the bicycle suspension tube according to the twelfth aspect, the caliper attachment part effectively improves flexibility of arrangement of the bicycle disc brake caliper with stabilizing an orientation of the bicycle disc brake caliper relative to the bicycle suspension tube.

In accordance with a thirteenth aspect of the present invention, the bicycle suspension tube according to any one of the first to twelfth aspects is configured so that the caliper attachment part includes a second through hole having a second longitudinal axis non-parallel to the rotational center axis. The first longitudinal axis and the second longitudinal axis are parallel to one another. A minimum distance is defined between the first longitudinal axis and the second longitudinal axis. The minimum distance is equal to or larger than 15 mm and is equal to or smaller than 55 mm.

With the bicycle suspension tube according to the thirteenth aspect, the minimum distance improves flexibility of arrangement of the bicycle disc brake caliper with improving coupling strength between the bicycle disc brake caliper and the bicycle suspension tube.

In accordance with a fourteenth aspect of the present invention, the bicycle suspension tube according to any one of the first to thirteenth aspect is configured so that the caliper attachment part includes: a mounting surface to be in contact with a bicycle disc brake caliper; and a receiving recess configured to receive a head portion of a fastener which attaches the bicycle disc brake caliper to the caliper attachment part. The receiving recess is arranged opposite to the mounting surface.

With the bicycle suspension tube according to the fourteenth aspect, the mounting surface stabilizes an orientation of the bicycle disc brake caliper relative to the bicycle suspension tube. Furthermore, the receiving recess improves design freedom of the fastener. Thus, it is possible to stabilize the orientation of the bicycle disc brake caliper relative to the bicycle suspension tube with improving design freedom of the fastener.

In accordance with a fifteenth aspect of the present invention, the bicycle suspension tube according to the fourteenth aspect is configured so that the tubular body includes a curved surface defining the receiving recess.

With the bicycle suspension tube according to the fifteenth aspect, the curved surface reduces or prevents interference between the bicycle suspension tube and the fastener.

In accordance with a sixteenth aspect of the present invention, the bicycle suspension tube according to any one of the first to fifteenth aspects is configured so that the tubular body includes a caliper attachment recess configured to receive a bicycle disc brake caliper.

With the bicycle suspension tube according to the sixteenth aspect, the caliper attachment recess reduces or prevents interference between the bicycle suspension tube and the bicycle disc brake caliper.

In accordance with a seventeenth aspect of the present invention, the bicycle suspension tube according to the sixteenth aspect is configured so that the tubular body includes a flat surface defining the caliper attachment recess.

With the bicycle suspension tube according to the seventeenth aspect, the flat surface allows the caliper attachment recess to be easily formed.

In accordance with an eighteenth aspect of the present invention, a bicycle suspension fork comprises the bicycle suspension tube according to any one of the first to seventeenth aspects and an additional suspension tube movably coupled to the bicycle suspension tube.

With the bicycle suspension fork according to the eighteenth aspect, it is possible to absorb shocks.

In accordance with a nineteenth aspect of the present invention, the bicycle suspension fork according to the eighteenth aspect is configured so that the additional suspension tube is telescopically received in the bicycle suspension tube.

With the bicycle suspension fork according to the nineteenth aspect, it is possible to utilize the bicycle suspension tube as an outer tube of the bicycle suspension fork.

In accordance with a twentieth aspect of the present invention, the bicycle suspension fork according to the eighteenth aspect is configured so that the bicycle suspension tube is telescopically received in the additional suspension tube.

With the bicycle suspension fork according to the twentieth aspect, it is possible to utilize the bicycle suspension tube as an inner tube of the bicycle suspension fork.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

First Embodiment

Figure 1:
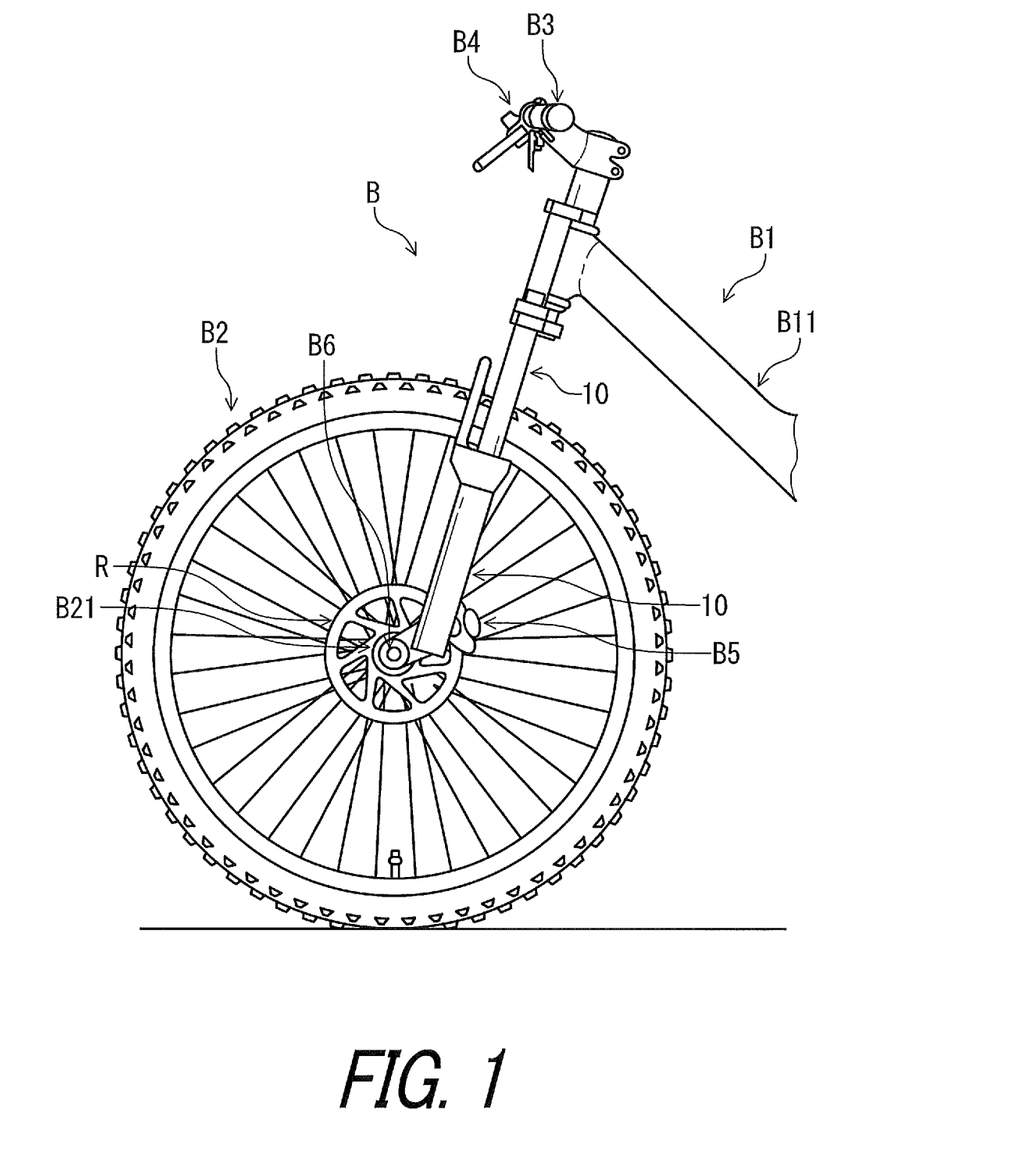
FIG. 1 is a side elevational view of a front portion of a bicycle with a bicycle suspension fork in accordance with a first embodiment.

Referring initially to FIG. 1, a bicycle B includes a bicycle suspension fork 10 in accordance with a first embodiment. The bicycle B further includes a bicycle body B1, a front wheel B2, a rear wheel (not shown), a drive train (not shown), a handlebar B3, a hydraulic operating device B4, and a bicycle disc brake caliper B5. The bicycle body B1 includes a bicycle frame B11 and the bicycle suspension fork 10 rotatably coupled to the bicycle frame B11. The front wheel B2 is rotatably mounted to the bicycle suspension fork 10 that is a bicycle front fork. The handlebar B3 is attached to a front fork column of the bicycle suspension fork 10. A hub assembly B21 of the front wheel B2 is mounted to the bicycle suspension fork 10 with a wheel securing structure B6. The rear wheel is rotatably mounted to chain stays of the bicycle frame B11. The hydraulic operating device B4 is mounted on the handlebar B3 and is connected to the bicycle disc brake caliper B5 with a hydraulic hose (not shown). The bicycle disc brake caliper B5 is attached to the bicycle suspension fork 10 to apply a braking force to a disc brake rotor R in response to an operation of the hydraulic operating device B4.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the handlebar B3. Accordingly, these terms, as utilized to describe the bicycle suspension fork 10, should be interpreted relative to the bicycle B equipped with the bicycle suspension fork 10 as used in an upright riding position on a horizontal surface.

Figure 2:
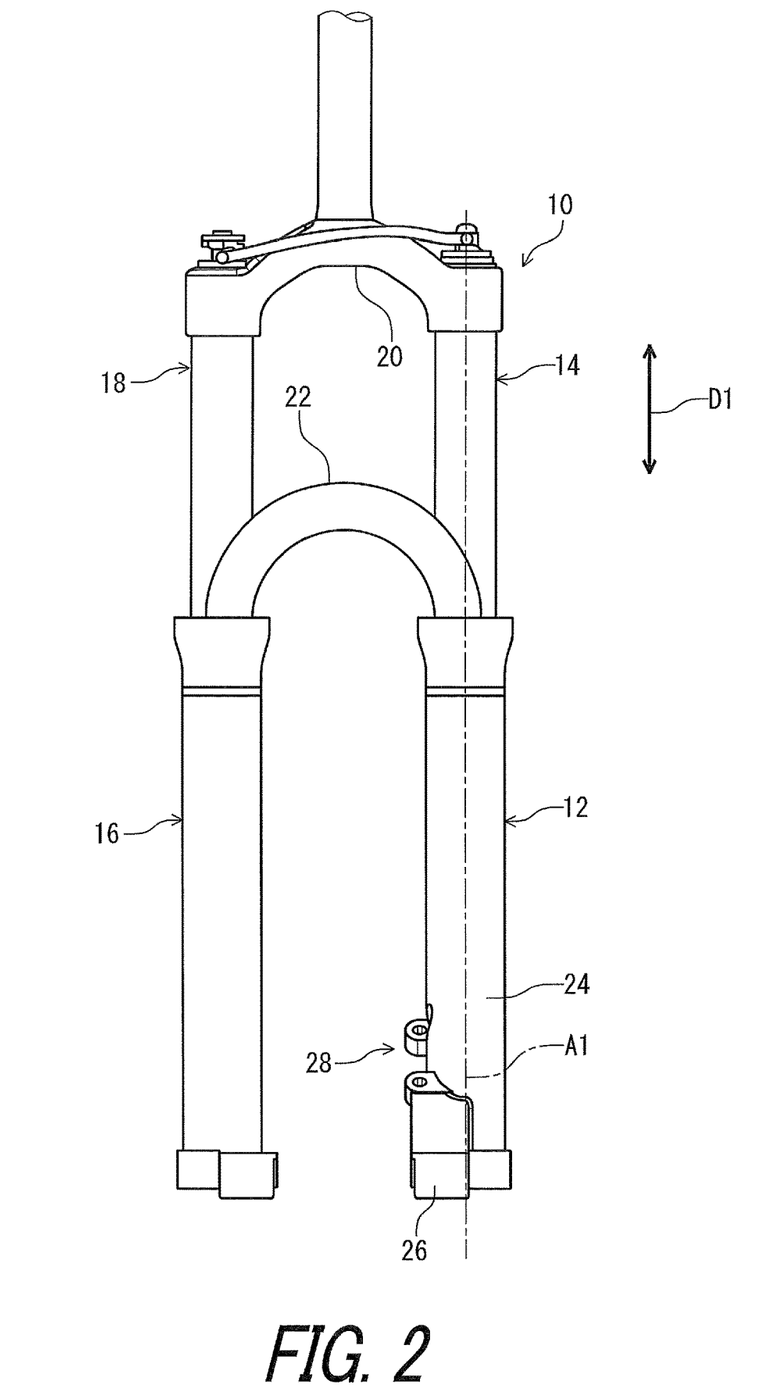
FIG. 2 is a front view of the bicycle suspension fork illustrated in FIG. 1.

As seen in FIG. 2, the bicycle suspension fork 10 comprises a bicycle suspension tube 12 and an additional suspension tube 14 movably coupled to the bicycle suspension tube 12. In this embodiment, the additional suspension tube 14 is telescopically received in the bicycle suspension tube 12. Namely, the bicycle suspension tube 12 is an outer tube, and the additional suspension tube 14 is an inner tube. However, the bicycle suspension tube 12 can be an inner tube, and the additional suspension tube 14 can be an outer tube.

The bicycle suspension fork 10 further includes an outer tube 16, an inner tube 18, a crown 20, and a coupling arm 22. The inner tube 18 is movably coupled to the outer tube 16 and is telescopically received in the outer tube 16. The bicycle suspension tube 12 and the additional suspension tube 14 are movable relative to each other in a telescopic direction D1 to absorb shocks from rough terrain. The outer tube 16 and the inner tube 18 are movable relative to each other in the telescopic direction D1 to absorb shocks from rough terrain. The crown 20 couples the additional suspension tube 14 and the inner tube 18. The coupling arm 22 couples the bicycle suspension tube 12 and the outer tube 16. Spring and damping structures are provided in an inside of the bicycle suspension tube 12 and the additional suspension tube 14 and an inside of the outer tube 16 and the inner tube 18, respectively. Since this kind of the structures of the bicycle suspension fork 10 has been known in the bicycle field, it will not be described in detail here for the sake of brevity.

Figure 3:
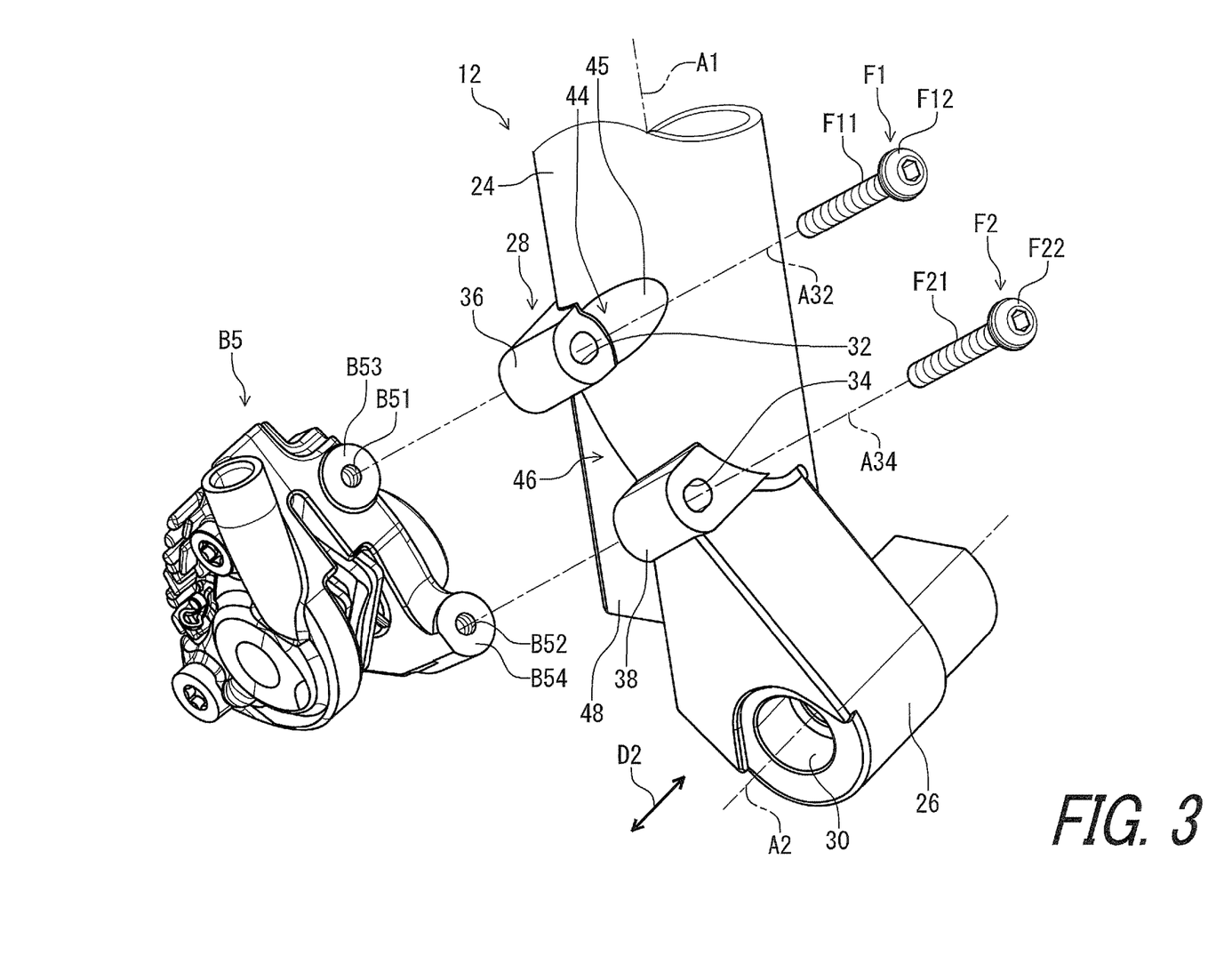
FIG. 3 is a perspective view of a bicycle suspension tube of the bicycle suspension fork illustrated in FIG. 1, with a bicycle disc brake caliper.

As seen in FIG. 3, the bicycle disc brake caliper B5 is attached to the bicycle suspension tube 12 with fasteners F1 and F2. Examples of the fasteners F1 and F2 include a bolt. The fastener F1 includes an externally threaded portion F11 and a head portion F12 provided at an end of the externally threaded portion F11. The fastener F2 includes an externally threaded portion F21 and a head portion F22 provided at an end of the externally threaded portion F21. The fastener F1 is threadedly engaged with a threaded hole B51 of the bicycle disc brake caliper B5. The fastener F2 is threadedly engaged with a threaded hole B52 of the bicycle disc brake caliper B5. The bicycle disc brake caliper B5 includes a first mounting surface B53 and a second mounting surface B54. The threaded hole B51 is provided on the first mounting surface B53. The threaded hole B52 is provided on the second mounting surface B54. The first mounting surface B53 is spaced apart from the second mounting surface B54. However, the first mounting surface B53 can be continuously provided with the second mounting surface B54.

As seen in FIG. 3, the bicycle suspension tube 12 comprises a tubular body 24, a wheel attachment part 26, and a caliper attachment part 28. The tubular body 24 has a tube center axis A1. The tubular body 24 extends along the tube center axis A1. The wheel attachment part 26 is provided on the tubular body 24. The caliper attachment part 28 is provided on the tubular body 24.

The wheel attachment part 26 includes an attachment hole 30 having a rotational center axis A2. The wheel attachment part 26 extends from an end 24A of the tubular body 24. A support axle of the wheel securing structure B6 (FIG. 1) extends through the attachment hole 30. The wheel securing structure B6 detachably couples the hub assembly B21 (FIG. 1) of the front wheel B2 to the bicycle suspension tube 12.

Figure 4:
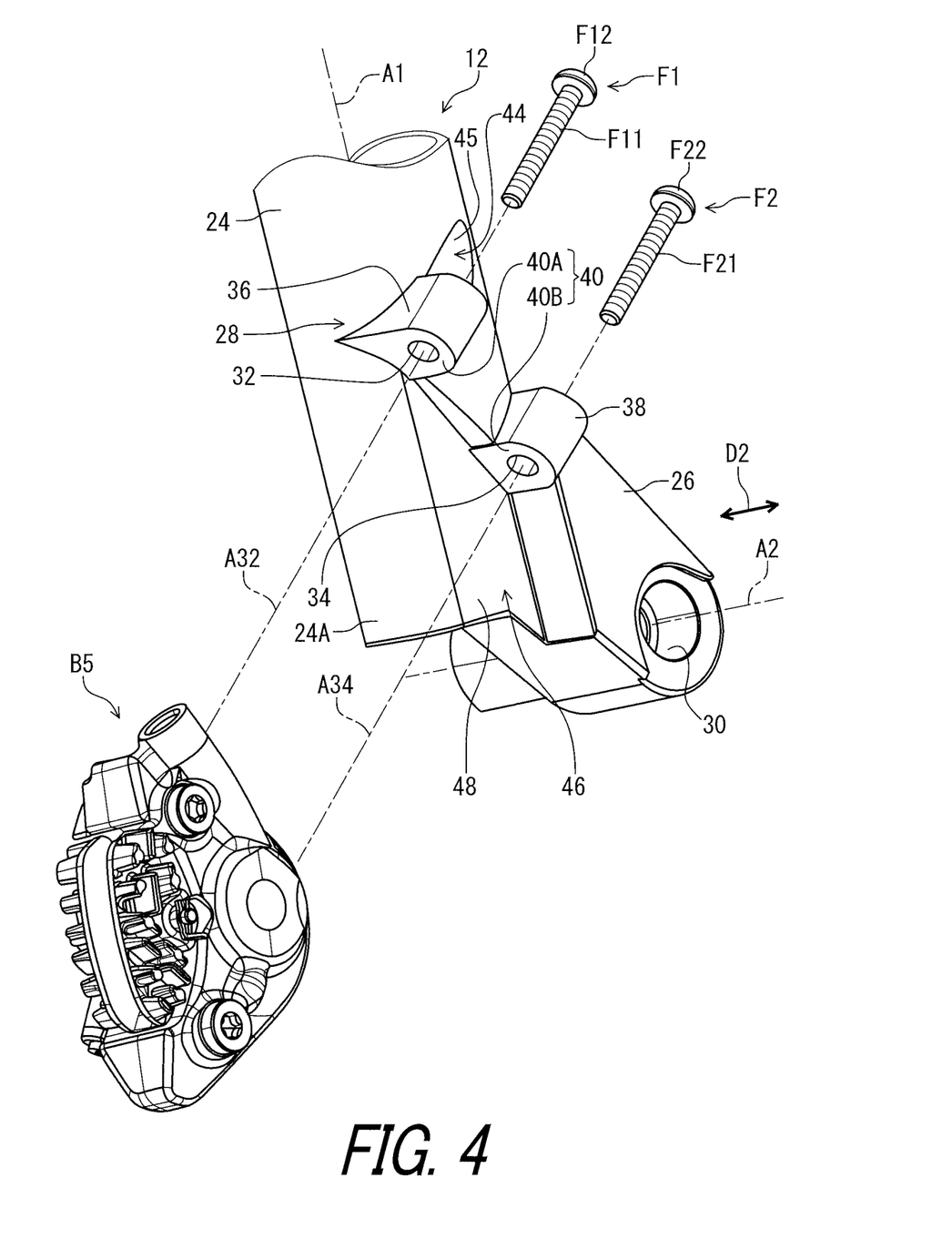
FIG. 4 is another perspective view of the bicycle suspension tube of the bicycle suspension fork illustrated in FIG. 1, with the bicycle disc brake caliper.

As seen in FIG. 4, the caliper attachment part 28 includes a first through hole 32 and a second through hole 34. The first through hole 32 has a first longitudinal axis A32 non-parallel to the rotational center axis A2. The first through hole 32 extends along the first longitudinal axis A32. The second through hole 34 has a second longitudinal axis A34 non-parallel to the rotational center axis A2. The second through hole 34 extends along the second longitudinal axis A34. The first longitudinal axis A32 is extending without defining an imaginary plane between the first longitudinal axis A32 and the rotational center axis A2. The second longitudinal axis A34 is extending without defining an imaginary plane between the second longitudinal axis A34 and the rotational center axis A2.

In this embodiment, the first longitudinal axis A32 and the second longitudinal axis A34 are parallel to one another. The first longitudinal axis A32 and the second longitudinal axis A34 are perpendicular to an axial direction D2 of the rotational center axis A2 as viewed in a direction perpendicular to the first and second longitudinal axes A32 and A34 and the rotational center axis A2. However, the positional relationship among the first longitudinal axis A32, the second longitudinal axis A34, and the rotational center axis A2 is not limited to this embodiment.

Each of the first through hole 32 and the second through hole 34 is a clearance hole which is free of an internal thread. However, at least one of the first through hole 32 and the second through hole 34 can include an internal thread. Each of the first through hole 32 and the second through hole 34 is an elongated hole extending in the axial direction D2. However, at least one of the first through hole 32 and the second through hole 34 can be a circular hole or other type of holes having other shapes.

As seen in FIG. 4, the caliper attachment part 28 includes a first attachment portion 36 and a second attachment portion 38. The first attachment portion 36 includes the first through hole 32. The second attachment portion 38 includes the second through hole 34. The second attachment portion 38 is spaced apart from the first attachment portion 36. However, the second attachment portion 38 can be continuously provided with the first attachment portion 36.

The caliper attachment part 28 includes a caliper attachment surface 40 to be in contact with the bicycle disc brake caliper B5. In this embodiment, the caliper attachment surface 40 includes a first attachment surface 40A and a second attachment surface 40B. The first attachment surface 40A is provided on the first attachment portion 36. The second attachment surface 40B is provided on the second attachment portion 38. The first through hole 32 is provided on the first attachment surface 40A. The second through hole 34 is provided on the second attachment surface 40B. The first attachment surface 40A is spaced apart from the second attachment surface 40B. However, the first attachment surface 40A can be continuously provided with the second attachment surface 40B. A surface treatment can be applied to the caliper attachment surface 40 to increase contact resistance between the caliper attachment surface 40 and the bicycle disc brake caliper B5.

As seen in FIG. 4, the caliper attachment part 28 includes a receiving recess 44 configured to receive the head portion F12 of the fastener F1 which attaches the bicycle disc brake caliper B5 to the caliper attachment part 28. The receiving recess 44 is arranged opposite to the caliper attachment surface 40. The receiving recess 44 is arranged opposite to the first attachment surface 40A. In this embodiment, the tubular body 24 includes a curved surface 45 defining the receiving recess 44. However, the arrangement and/or the shape of the receiving recess 44 is not limited to this embodiment.

The tubular body 24 includes a caliper attachment recess 46 configured to receive the bicycle disc brake caliper B5. The tubular body 24 includes a flat surface 48 defining the caliper attachment recess 46. The bicycle disc brake caliper B5 is provided in the caliper attachment recess 46 in a state where the bicycle disc brake caliper B5 is attached to the caliper attachment part 28.

Figure 5:
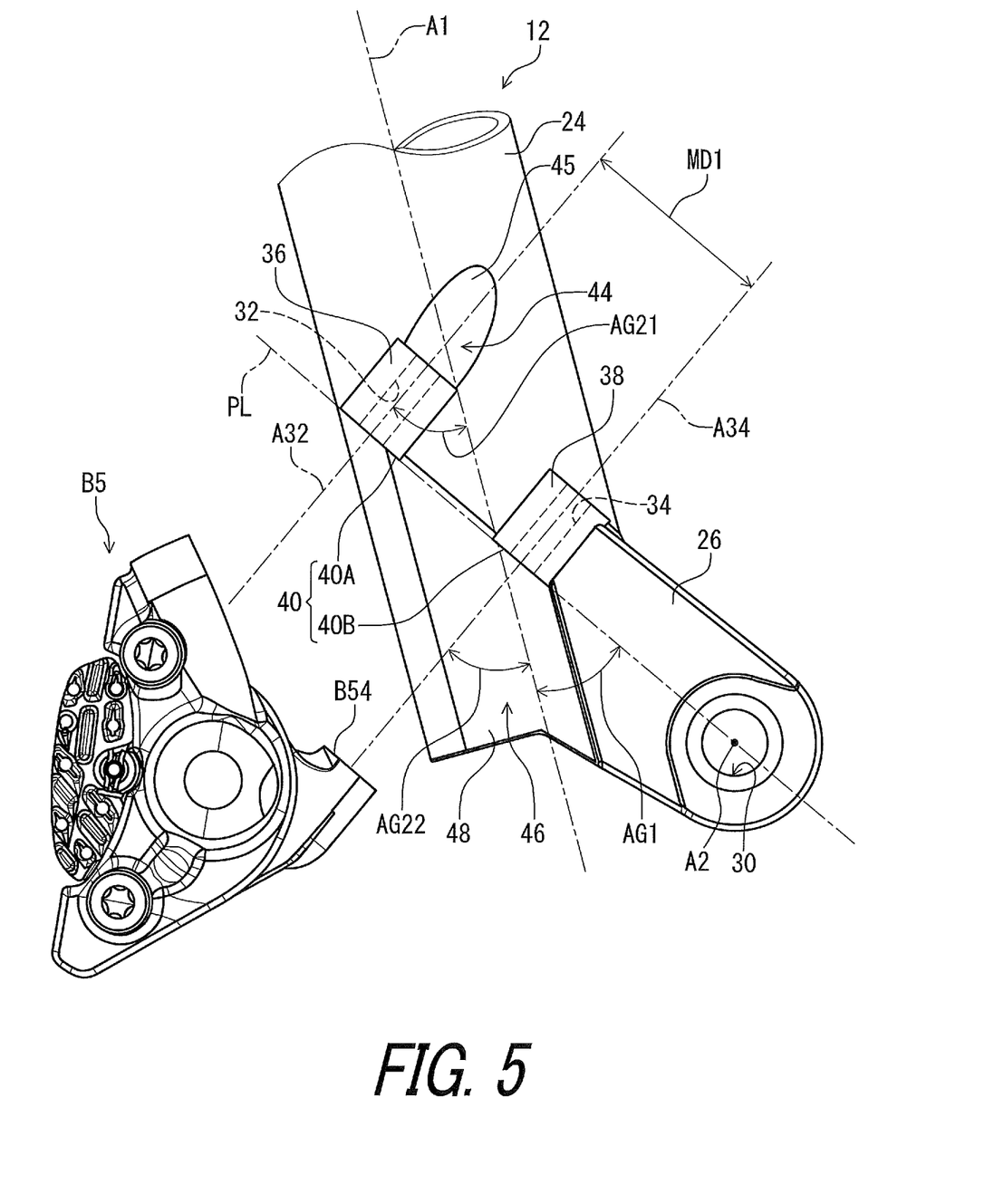
FIG. 5 is a side elevational view of the bicycle suspension tube of the bicycle suspension fork illustrated in FIG. 1, with the bicycle disc brake caliper.

As seen in FIG. 5, the first attachment surface 40A and the second attachment surface 40B are provided on a single plane PL. The caliper attachment surface 40 is inclined relative to the tube center axis A1 as viewed in the axial direction D2 of the rotational center axis A2. An inclination angle AG1 is defined between the caliper attachment surface 40 and the tube center axis A1 as viewed in the axial direction D2. The inclination angle AG1 is equal to or larger than 10 degrees and is equal to or smaller than 60 degrees. The inclination angle AG1 preferably is equal to or larger than 25 degrees and is equal to or smaller than 45 degrees. The inclination angle AG1 more preferably is equal to or larger than 30 degrees and is equal to or smaller than 40 degrees. In this embodiment, the inclination angle AG1 is equal to approximately 35 degrees. However, the inclination angle AG1 is not limited to this embodiment and the above ranges.

The first longitudinal axis A32 and the second longitudinal axis A34 are inclined relative to the tube center axis A1 as viewed in the axial direction D2 of the rotational center axis A2. A first inclination angle AG21 is defined between the first longitudinal axis A32 and the tube center axis A1 as viewed in the axial direction D2. A second inclination angle AG22 is defined between the second longitudinal axis A34 and the tube center axis A1 as viewed in the axial direction D2. The first inclination angle AG21 is equal to or larger than 30 degrees and is equal to or smaller than 70 degrees. The second inclination angle AG22 is equal to or larger than 30 degrees and is equal to or smaller than 70 degrees. The first inclination angle AG21 preferably is equal to or larger than 40 degrees and is equal to or smaller than 65 degrees. The first inclination angle AG21 more preferably is equal to or larger than 50 degrees and is equal to or smaller than 60 degrees. The second inclination angle AG22 preferably is equal to or larger than 40 degrees and is equal to or smaller than 65 degrees. The second inclination angle AG22 more preferably is equal to or larger than 50 degrees and is equal to or smaller than 60 degrees. In this embodiment, the first inclination angle AG21 is equal to approximately 55 degrees. The second inclination angle AG22 is equal to approximately 55 degrees. However, the first inclination angle AG21 and the second inclination angle AG22 are not limited to this embodiment and the above ranges.

A minimum distance MD1 is defined between the first longitudinal axis A32 and the second longitudinal axis A34. The minimum distance MD1 is equal to or larger than 15 mm and is equal to or smaller than 55 mm. The minimum distance MD1 preferably is equal to or larger than 30 mm and is equal to or smaller than 40 mm. In this embodiment, the minimum distance MD1 is equal to approximately 34 mm. However, the minimum distance MD1 is not limited to this embodiment and the above ranges.

Second Embodiment

A bicycle suspension fork 210 in accordance with a second embodiment will be described below referring to FIG. 6. The bicycle suspension fork 210 has the same structure as that of the bicycle suspension fork 10 except for the arrangement of the bicycle suspension tube 12 and the additional suspension tube 14. Thus, elements having substantially the same function as those in the first embodiment will be numbered the same here, and will not be described and/or illustrated again in detail here for the sake of brevity.

Figure 6:
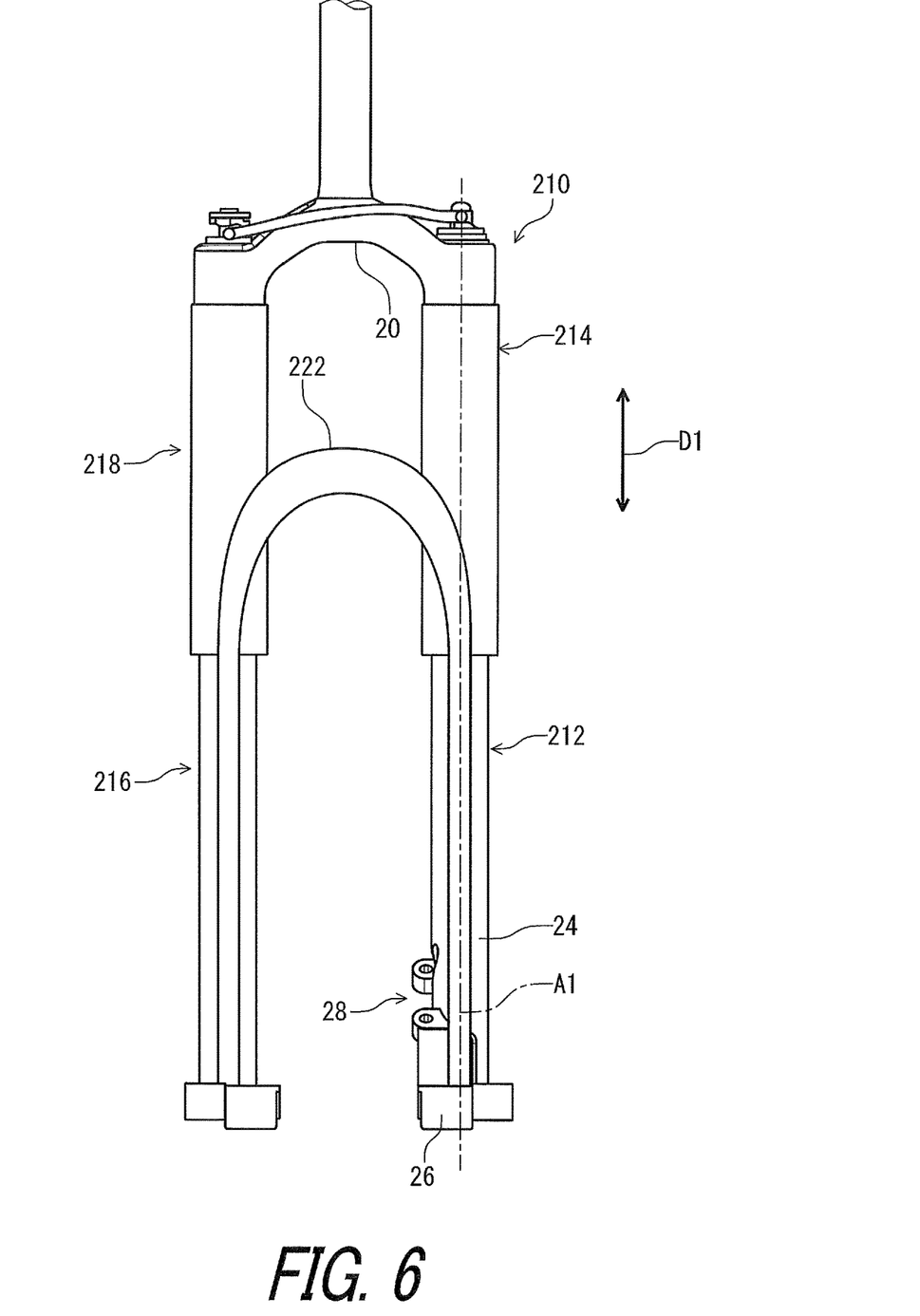
FIG. 6 is a front view of a bicycle suspension fork in accordance with a second embodiment.

As seen in FIG. 6, the bicycle suspension fork 210 comprises a bicycle suspension tube 212 and an additional suspension tube 214. In this embodiment, the bicycle suspension tube 212 is telescopically received in the additional suspension tube 214. Namely, the bicycle suspension tube 212 is an inner tube, and the additional suspension tube 214 is an outer tube.

The bicycle suspension fork 210 further includes an inner tube 216, an outer tube 218, the crown 20, and a coupling arm 222. The inner tube 216 is movably coupled to the outer tube 218 and is telescopically received in the outer tube 218. The bicycle suspension tube 212 and the additional suspension tube 214 are movable relative to each other in the telescopic direction D1 to absorb shocks from rough terrain. The inner tube 216 and the outer tube 218 are movable relative to each other in the telescopic direction D1 to absorb shocks from rough terrain. The crown 20 couples the additional suspension tube 214 and the outer tube 218. The coupling arm 222 couples the bicycle suspension tube 212 and the inner tube 216.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle suspension tube comprising:
    a tubular body;
    a wheel attachment part provided on the tubular body, the wheel attachment part including an attachment hole having a rotational center axis; and
    a caliper attachment part provided on the tubular body, the caliper attachment part including a first through hole having a first longitudinal axis non-parallel to the rotational center axis, wherein
    the first longitudinal axis does not extend in a direction that intersects the tubular body,
    the caliper attachment part includes a second through hole having a second longitudinal axis non-parallel to the rotational center axis,
    a first inclination angle is defined between the first longitudinal axis and the tube center axis as viewed in the axial direction,
    the first inclination angle is equal to or larger than 30 degrees and is equal to or smaller than 70 degrees,
    a second inclination angle is defined between the second longitudinal axis and the tube center axis as viewed in the axial direction, and
    the second inclination angle is equal to or larger than 30 degrees and is equal to or smaller than 70 degrees.

2. The bicycle suspension tube according to claim 1, wherein
    the tubular body has a tube center axis, and
    the caliper attachment part includes a caliper attachment surface inclined relative to the tube center axis as viewed in an axial direction of the rotational center axis.

3. The bicycle suspension tube according to claim 2, wherein
    the caliper attachment surface includes a first attachment surface and a second attachment surface.

4. The bicycle suspension tube according to claim 3, wherein
    the first through hole is provided on the first attachment surface, and
    the second through hole is provided on the second attachment surface.

5. The bicycle suspension tube according to claim 1, wherein
    the caliper attachment part includes a first attachment portion and a second attachment portion spaced apart from the first attachment portion,
    the first attachment portion includes the first through hole, and
    the second attachment portion includes the second through hole.

6. The bicycle suspension tube according to claim 1, wherein
    the first longitudinal axis and the second longitudinal axis are parallel to one another,
    a minimum distance is defined between the first longitudinal axis and the second longitudinal axis, and
    the minimum distance is equal to or larger than 15 mm and is equal to or smaller than 55 mm.

7. The bicycle suspension tube according to claim 1, wherein
    the caliper attachment part includes:
        a mounting surface to be in contact with a bicycle disc brake caliper; and
        a receiving recess configured to receive a head portion of a fastener which attaches the bicycle disc brake caliper to the caliper attachment part, the receiving recess being arranged opposite to the mounting surface.

8. A bicycle suspension fork comprising:
    the bicycle suspension tube according to claim 1; and
    an additional suspension tube movably coupled to the bicycle suspension tube.

9. The bicycle suspension fork according to claim 8, wherein
    the additional suspension tube is telescopically received in the bicycle suspension tube.

10. The bicycle suspension fork according to claim 8, wherein
    the bicycle suspension tube is telescopically received in the additional suspension tube.

11. The bicycle suspension tube according to claim 1, wherein
    the through hole extends through the caliper attachment part from a first surface thereof to a second surface thereof.

12. The bicycle suspension tube according to claim 1, wherein
    the second longitudinal axis does not extend in a direction that intersects the tubular body.

13. A bicycle suspension tube comprising:
    a tubular body;
    a wheel attachment part provided on the tubular body, the wheel attachment part including an attachment hole having a rotational center axis; and
    a caliper attachment part provided on the tubular body, the caliper attachment part including a first through hole having a first longitudinal axis extending without defining an imaginary plane between the first longitudinal axis and the rotational center axis, wherein the first longitudinal axis does not extend in a direction that intersects the tubular body, the caliper attachment part includes a second through hole having a second longitudinal axis extending without defining an imaginary plane between the second longitudinal axis and the rotational center axis, the tubular body has a tube center axis, and the first longitudinal axis and the second longitudinal axis are inclined relative to the tube center axis as viewed in an axial direction of the rotational center axis.

14. The bicycle suspension tube according to claim 13, wherein a first inclination angle is defined between the first longitudinal axis and the tube center axis as viewed in the axial direction, and the first inclination angle is equal to or larger than 30 degrees and is equal to or smaller than 70 degrees.

15. A bicycle suspension tube comprising:

a tubular body;

a wheel attachment part provided on the tubular body, the wheel attachment part including an attachment hole having a rotational center axis; and a caliper attachment part provided on the tubular body, the caliper attachment part including a first through hole having a first longitudinal axis non-parallel to the rotational center axis, wherein the first longitudinal axis does not extend in a direction that intersects the tubular body, the tubular body has a tube center axis, the caliper attachment part includes a caliper attachment surface inclined relative to the tube center axis as viewed in an axial direction of the rotational center axis, an inclination angle is defined between the caliper attachment surface and the tube center axis as viewed in the axial direction, and the inclination angle is equal to or larger than 10 degrees and is equal to or smaller than 60 degrees.

16. A bicycle suspension tube comprising:

a tubular body;

a wheel attachment part provided on the tubular body, the wheel attachment part including an attachment hole having a rotational center axis; and a caliper attachment part provided on the tubular body, the caliper attachment part including a first through hole having a first longitudinal axis non-parallel to the rotational center axis, wherein the first longitudinal axis does not extend in a direction that intersects the tubular body, the caliper attachment part includes:

a mounting surface to be in contact with a bicycle disc brake caliper; and a receiving recess configured to receive a head portion of a fastener which attaches the bicycle disc brake caliper to the caliper attachment part, the receiving recess being arranged opposite to the mounting surface, and the tubular body includes a curved surface defining the receiving recess.

17. A bicycle suspension tube comprising:

a tubular body;

a wheel attachment part provided on the tubular body, the wheel attachment part including an attachment hole having a rotational center axis; and a caliper attachment part provided on the tubular body, the caliper attachment part including a first through hole having a first longitudinal axis non-parallel to the rotational center axis, wherein the first longitudinal axis does not extend in a direction that intersects the tubular body, and the tubular body includes a caliper attachment recess configured to receive a bicycle disc brake caliper.

18. The bicycle suspension tube according to claim 17, wherein the tubular body includes a flat surface defining the caliper attachment recess.

19. A bicycle suspension tube comprising:

a tubular body;

a wheel attachment part provided on the tubular body, the wheel attachment part including an attachment hole having a rotational center axis; and a caliper attachment part provided on the tubular body, the caliper attachment part including a first through hole having a first longitudinal axis extending without defining an imaginary plane between the first longitudinal axis and the rotational center axis, wherein the first longitudinal axis does not extend in a direction that intersects the tubular body, the caliper attachment part includes a second through hole having a second longitudinal axis extending without defining an imaginary plane between the second longitudinal axis and the rotational center axis, the tubular body has a tube center axis, and the first longitudinal axis and the second longitudinal axis are offset relative to the tube center axis.

20. A bicycle suspension tube comprising:

a tubular body;

a wheel attachment part provided on the tubular body, the wheel attachment part including an attachment hole having a rotational center axis; and a caliper attachment part provided on the tubular body, the caliper attachment part including a first through hole having a first longitudinal axis non-parallel to the rotational center axis, wherein the tubular body has a tube center axis, the caliper attachment part includes a first attachment portion and a second attachment portion spaced apart from the first attachment portion, and the first attachment portion and the second attachment portion are arranged on opposite sides of the tube center axis as viewed in an axial direction of the rotational center axis.

* * * * *